(12) United States Patent  
Saito (10) Patent No.: US 8,184,350 B2  
(45) Date of Patent: May 22, 2012

(54) IMAGE DISPLAY APPARATUS (75) Inventor: Kenichi Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 503 days.

(21) Appl. No.: 12/331,590

(22) Filed: Dec. 10, 2008

(65) Prior Publication Data

US 2009/0153969 A1  Jun. 18, 2009

(30) Foreign Application Priority Data

Dec. 13, 2007 (JP) ................................. 2007-322646

(51) Int. Cl.
*G03H 1/00* (2006.01)
(52) U.S. Cl. .......................................................... 359/13
(58) Field of Classification Search ................ 359/1–35, 359/107–108, 834, 837; 345/7–9
See application file for complete search history.

(56) References Cited

U.S. PATENT DOCUMENTS

| 6,512,635 B1* | 1/2003 | Takeyama | 359/638 |
| 6,522,473 B2 | 2/2003 | Takeyama | |
| 2002/0060850 A1* | 5/2002 | Takeyama | 359/630 |
| 2003/0034935 A1 | 2/2003 | Amanai et al. | |
| 2004/0257663 A1* | 12/2004 | Edelmann | 359/631 |

FOREIGN PATENT DOCUMENTS

| JP | 2911750 A | 12/1995 |
| JP | 09/065246 A | 3/1997 |
| JP | 3559624 A | 3/1997 |
| JP | 09-127321 A | 5/1997 |
| JP | 09/127322 A | 5/1997 |
| JP | 3482396 A | 8/2001 |
| JP | 2002-072131 A | 3/2002 |
| JP | 2002-098929 A | 4/2002 |
| JP | 2002-311380 A | 10/2002 |
| JP | 2002-318366 A | 10/2002 |

* cited by examiner

*Primary Examiner* — Stephone Allen  
*Assistant Examiner* — Kimberly N Kakalec  
(74) *Attorney, Agent, or Firm* — Canon U.S.A., Inc. IP Division (57) ABSTRACT

The image display apparatus includes an image-forming element configured to form an original image, a first optical element configured to reflect a light flux from the image-forming element sequentially by plural reflective surfaces to cause the light flux to emerge from the first optical element, and an optical system configured to introduce the light flux from the first optical element to an exit pupil of the optical system. The optical system includes a diffractive optical element. In the optical system, a first portion closer to the exit pupil than the diffractive optical element has a negative optical power. No decentered surface having an optical power is provided between the diffractive optical element and the exit pupil.

6 Claims, 9 Drawing Sheets

IMAGE DISPLAY APPARATUS

BACKGROUND OF THE INVENTION

The present invention relates to an image display apparatus such as an HMD (Head-Mounted Display), especially an image display apparatus having an optical system including a diffractive optical element.

The image display apparatus such as an HMD is required to be capable of showing an image at a wide view angle and to have a small-sized and light-weight configuration which does not give an uncomfortable feeling or a feeling of weariness to an observer even if the observer mounts it on his/her head. However, when the view angle increases, the size of the optical system generally increases exponentially and aberration correction becomes difficult to be achieved.

A Single prism optical system for the HMD using internal total reflection and free-formed surfaces has been proposed in Japanese Patent No. 2911750. In this optical system, a single prism introduces a light flux from an image-forming element such as a liquid crystal panel to an exit pupil where an eyeball of an observer is placed through transmission and refraction at an entrance surface (first surface), internal total reflection at a second surface, back surface reflection at a third surface, and transmission and refraction at the second surface as a fourth surface. In this optical system, since the single prism is formed of a single material, chromatic aberration of magnification generated due to dispersion of the prism material when the light flux is transmitted through its transmissive surface cannot be corrected sufficiently.

On the contrary, HMDs have been disclosed in which a holographic element (see Japanese Patent Laid-Open No. 2002-318366) or a diffractive optical element (DOE: see Japanese Patent Laid-Open No. 09-65246)) is disposed between a prism and a lens for the purpose of achromatizing.

In the HMD disclosed in Japanese Patent Laid-Open No. 2002-318366, it is necessary to use glass for a material having dispersion which is capable of obtaining an achromatizing effect, which results in increase in weight of the HMD. In the HMD disclosed in Japanese Patent Laid-Open No. 09-65246, although using the DOE enables effective achromatizing for light of a specific wavelength region, it is difficult to suppress unnecessary diffraction order light from being generated in the entire view angle region for light of a wide wavelength region forming a color image.

The DOE has a negative dispersion due to its characteristics. Therefore, although the chromatic aberration of magnification generated in a general optical material can be efficiently corrected, a diffraction efficiency of 100% or close thereto cannot be achieved under conditions other than a specific wavelength region and a specific incident angle, so that unnecessary diffraction order light is generated. In this case, when an image with a high contrast is displayed, flare is generated which deteriorates image quality of the displayed image or a contrast of a high frequency image is decreased.

In contrast thereto, a method for achieving a high diffraction efficiency in a wide wavelength region has been disclosed in Japanese Patent Laid-open Nos. 09-127321 and 09-127322. In this method, plural DOEs which are produced by mutually different materials to have mutually different design diffraction orders are mutually closely arranged.

Further, examples of correcting the chromatic aberration of magnification by using DOE in the optical system for the HMD have been disclosed in Japanese Patent Nos. 3482396 and 3559624, and Japanese Patent Laid-open No. 2002-311380.

In the HMD disclosed in Japanese Patent No. 3482396, a prism having three surfaces including a transmissive surface, a transmissive/reflective surface and a reflective surface folds an optical path of a light flux from an image-forming element in the prism to introduce the light flux to an exit pupil. The HMD is provided with the DOE having the function of correcting the chromatic aberration of magnification at any position between the image-forming element and the exit pupil.

In the HMD disclosed in Japanese Patent No. 3559624, a decentered prism is used which has three surfaces including at least one rotationally asymmetric formed surface, and the DOE formed on a parallel plate is disposed between the image-forming element and the prism.

Moreover, the HMD disclosed in Japanese Patent Laid-Open No. 2002-311380 is provided with a positive lens between the decentered prism and the exit pupil in order to enlarge the view angle. In addition thereto, to correct the chromatic aberration of magnification increased due to the lens, the DOE is provided on any surface provided in the optical path.

As described above, the use of the DOE enables correction of the chromatic aberration of magnification in optical design of the HMD. However, the following matters must be further considered due to a particular condition for the HMD in which the eyeball of the observer is placed at a position of the exit pupil.

In the HMD, a rotational position of the eyeball of the observer (that is, visual axis) does not always coincide with the optical axis of the optical system. In an optical system using only refraction and reflection, aberrations are corrected by increasing a diameter of the exit pupil as much as possible such that the entire displayed image can be observed favorably even though such incoincidence is occurred. Therefore, even though there exists a certain displacement between the visual axis of the observer and the optical axis of the optical system, serious problems do not occur in observing the image.

On the other hand, the design of the DOE used in the optical system is optimized for light rays reaching respective points on the DOE at a specific incident angle. However, when a pupil of the eyeball is displaced with respect to a center of the exit pupil such that the incident angle of the light rays reaching the DOE is significantly deviated from the specified incident angle, unnecessary diffraction order light is generated, thereby deteriorating image quality of the displayed image.

Particularly, providing a sufficient optical power to the DOE to correct chromatic aberrations reduces a pitch of the diffraction grating, which significantly increases the unnecessary diffraction order light. Japanese Patent Nos. 3482396 and 3559624, and Japanese Patent Laid-Open No. 2002-311380 do not describe about these problems.

In the case where the DOE is used for the HMD, it is desirable that the DOE is disposed at a position close to the exit pupil in the entire optical system from a viewpoint of assembly of the HMD and a space for disposing the DOE. Further, the optical system for the HMD often uses a decentered optical system and a rotationally asymmetric formed surface. However, it is difficult to form the DOE on an optical surface in the decentered optical system and the rotationally asymmetric curved surface because the surfaces have a complicated shape.

Moreover, even though a planar DOE is provided between these optical surfaces or between the image-forming element and the prism, the shape of the DOE becomes complicated, so that producing the DOE becomes difficult.

Further, the number of options of the image-forming elements having a small original image size is small, and it is necessary to keep an enlarging magnification ratio of the displayed image with respect to the original image at a certain ratio or lower. Therefore, if the DOE is disposed between the image-forming element and the prism, freedom of design of the optical system is reduced because of providing the space for disposing the DOE.

In contrast thereto, if the optical system is designed such that the DOE is disposed at a position closest to the exit pupil (eyeball of the observer) and the optical system does not include a decentered surface having an optical power between the DOE and the exit pupil, the DOE can be formed so as to have grating rings having a rotationally symmetric shape on a planar base member, which facilitates production of the DOE.

However, as mentioned above, if the visual axis of the observer does not coincide with the optical axis of the optical system, the incident angle onto the DOE of each light ray emerging from each point on the image-forming element, passing through the DOE and then reaching the eyeball is displaced with respect to the designed incident angle. In this case, a short distance from the eyeball to the DOE increases the difference between an actual incident angle of the light ray onto the DOE and the designed incident angle, which increases the unnecessary diffraction order light. If the DOE is provided with an optical power only for the achromatizing, the grating pitch at a high view angle reduces, thereby increasing the unnecessary diffraction order light more easily.

Such incoincidence between the visual axis of the observer and the optical axis of the optical system also occurs when the HMD is mounted on the head in a state where the exit pupil of the HMD is displaced with respect to the eyeball of the observer.

Thereafter, particularly when the DOE is disposed near the exit pupil, the optical system for the HMD requires optical measures to reduce the unnecessary diffraction order light caused by incoincidence between the visual axis of the observer and the optical axis of the optical system.

BRIEF SUMMARY OF THE INVENTION

The present invention provides an image display apparatus capable of suppressing generation of unnecessary diffraction order light (flare light) from a DOE due to incoincidence between a visual axis of an observer and an optical axis of an optical system.

The present invention provides as an aspect thereof an image display apparatus which includes an image-forming element configured to form an original image, a first optical element configured to reflect a light flux from the image-forming element sequentially by plural reflective surfaces to cause the light flux to emerge from the first optical element, and an optical system configured to introduce the light flux from the first optical element to an exit pupil of the optical system. The optical system includes a diffractive optical element. In the optical system, a first portion closer to the exit pupil than the diffractive optical element has a negative optical power. No decentered surface having an optical power is provided between the diffractive optical element and the exit pupil.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Embodiment 1

Prior to specific descriptions of Embodiments 2 to 4, common features of image display apparatuses of these embodiments are described as Embodiment 1.

1. The image display apparatus (HMD) of each embodiment includes an image-forming element configured to form an original image, a first optical element configured to reflect a light flux from the image-forming element by plural reflective surfaces to cause the light flux to emerge from the first optical element, an optical system configured to introduce the light flux from the first optical element to an exit pupil of the optical system. The optical system includes a diffractive optical element, and a portion (first portion) closer to the exit pupil than the diffractive optical element. The first portion has a negative optical power. Further, no decentered surface having an optical power is provided between the diffractive optical element and the exit pupil.

Figure 4A:
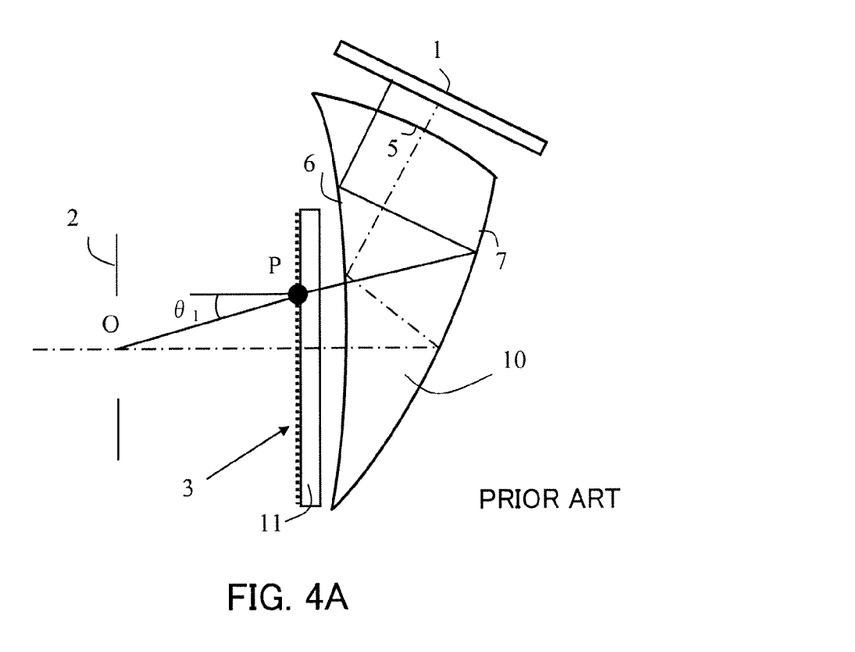
FIG. 4A is a cross-sectional view showing the configuration of a conventional HMD in which a base member of a single-layer DOE is a parallel plate.

In FIG. 4A, an optical system which is used as a display optical system (observation optical system) for an HMD is illustrated, which introduces a light flux from an image-forming element 1 to an exit pupil 2 via a prism 10 whose inside area surrounded by three surfaces 5 to 7 is filled up with a material having refractive index of 1 or more. At the exit pupil 2, an eyeball of an observer is disposed. The image-forming element 1 is a light modulation device such as a liquid crystal panel or an organic EL. At least one of the three surfaces 5 to 7 in the prism 10 is a rotationally asymmetric curved surface.

The light flux from the image-forming element 1 enters the prism 10 through the first surface 5 and is internally totally reflected at the second surface (reflective surface) 6 which faces toward the exit pupil 2. The light flux is then reflected at the third surface (reflective surface) 7, which is disposed on the opposite side of exit pupil 2 with respect to the second surface 6 and tilted with respect to the second surface 6, to proceed again toward the second surface 6, and is transmitted through the second surface (transmissive surface) 6 to reach the exit pupil 2. Thereby, an enlarged virtual image (hereinafter, referred to as an image or a presented image) of a two-dimensional original image formed on the image-forming element 1 is presented to the observer.

In order to correct chromatic aberration of magnification which occurs in the display optical system, a single layer diffractive optical element (DOE) 3 having plural gratings with concentric circle shapes (hereinafter, also referred to as grating rings) is provided between the second surface 6 and the exit pupil 2. The DOE 3 is formed on a parallel plate (substrate) 11. A center of the DOE 3 is located on an optical path of a light ray (central view angle principal ray) proceeding from a center of the original image (in other words, a center of the presented image) to a center of the exit pupil 2. That is, the center of the DOE 3 is located on a visual axis (line of sight) of the observer who gazes at the center of the presented image. Hereinafter, the optical path of the central view angle principal ray is also referred to as an optical axis of the display optical system.

The DOE 3 has a blazed shape. Grating pitches of the grating rings are decreased from the center of the DOE 3 toward a peripheral portion thereof according to a phase function set based on optical power necessary for correcting chromatic aberrations. A height of each grating ring is individually set such that a specific diffraction efficiency for a light ray passing through the grating ring becomes the maximum.

The shape of the DOE 3 will be described by backward ray tracing in which a light ray proceeds to the exit pupil 2 from the image-forming element 1 through the prism 10 and the DOE 3 is traced. In a case where a height d of one grating ring of the plural grating rings provided in the DOE 3 is properly set, the one grating ring including a point P whose distance r from a center of the DOE 3, an optical path difference function D is expressed as follows:

$$\phi(r,\lambda) = \{n_1(\lambda) \cdot \cos\theta_1 - n_2(\lambda) \cdot \cos\theta_2\} \cdot d(r)$$

$$(\theta_2 = \sin^{-1}[\{n_1(\lambda) \cdot \sin\theta_1 - m \cdot \lambda p\}/n_2]) \quad (1)$$

where $\lambda$ and $\theta_1$ respectively represent a wavelength of a light ray that enters the grating ring and an incident angle thereof onto the grating ring, p represents a grating pitch, $n_1$ and $n_2$ respectively represent an entrance side refractive index and exit side refractive index of a grating surface formed on the grating ring, m represents a diffraction order, and $\theta_2$ represents a diffraction angle of m-th order.

A scalar approximation diffraction efficiency n of the DOE 3 is expressed as follows:

$$\eta(r,\lambda) = \sin c^2[\pi \cdot \{m - \Phi(r,\lambda)/\lambda\}] \quad (2)$$

The height of each grating ring d should be properly set so that $\eta$ becomes the maximum or close thereto.

It is assumed that, when a light ray entering the point P is defined as a light ray that proceeds from a center O of the exit pupil 2 of the optical system to the point P, d is set by using $\theta_1$ and $\theta_2$ such that $\eta$ becomes the maximum. This setting means that, when a direction of the visual axis of the observer coincides with a direction of the optical axis, as for each light ray that enters into an eye of the observer from its pupil to reach its retina, a diffraction efficiency for a specific diffraction order is the maximum while a diffraction efficiency for an unnecessary diffraction order is the minimum. When a displayed image is actually observed, the observer rotates the eyeball toward respective view angle directions. Therefore, of light rays forming each view angle, a light ray passing through the center of the pupil of the eyeball should be considered. However, to simplify the explanation, the rotation of the eyeball is ignored here. This is applied to the following descriptions.

Figure 4B:
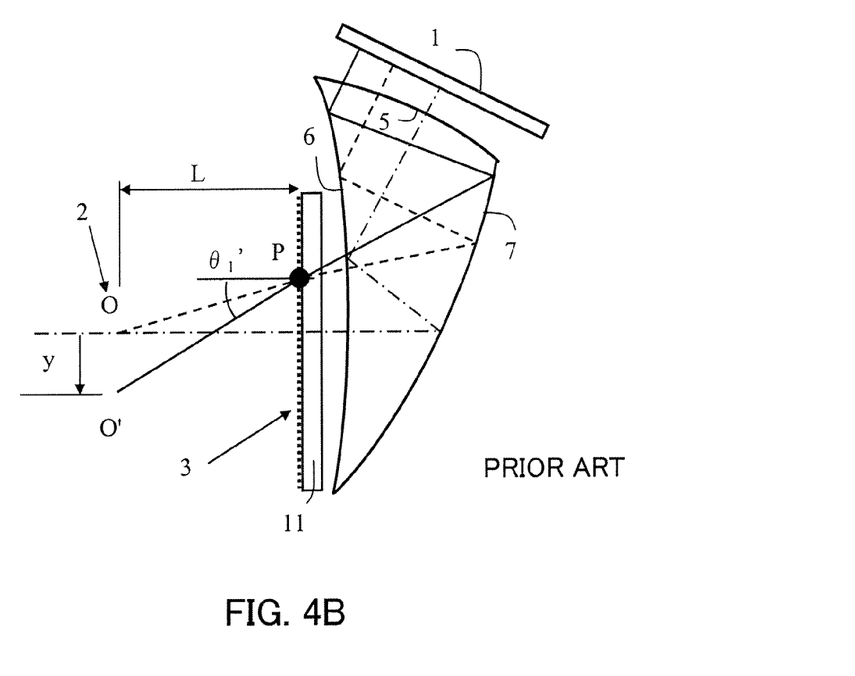
FIG. 4B is a cross-sectional view showing a state where an eyeball is displaced in the conventional HMD of FIG. 4A.

Next, as shown in FIG. 4B, a case is described in which the center of the pupil of the eyeball is located at a point O' which is displaced by y [mm] from the optical axis of the display optical system.

When L represents the distance from the exit pupil 2 to the DOE 3 on the optical axis, the incident angle $\theta_1$ of the light ray impinging on the point P on the DOE 3 from the center O of the exit pupil 2 is expressed by:

$$\theta_1 = a\tan(r/L).$$

On the other hand, the incident angle $\theta_1'$ of the light ray impinging on the point P on the DOE 3 from the point O' is expressed by:

$$\theta_1' = a\tan\{(r+y)/L\}.$$

That is, the incident angle $\theta_1'$ is different from a design incident angle $\theta_1$ by:

$$\theta_1' - \theta_1 = a\tan\{(r+y)/L\} - a\tan(r/L).$$

For instance, in a case of $n(\lambda_d) = 1.63554$, L=20 [mm] and r=7.279 [mm], the incident angle of the light ray on the point P when the center of the pupil of the eyeball coincides with the optical axis of the display optical system is:

$$\theta_1 = 20[°]$$

where $\lambda_d = 587.56$ nm.

When the phase function of the DOE 3 is defined as:

$$\sum_{k=1}^{5} C_k R(m)^{2k} = m\lambda$$

(m represents an integral number, and R represents a radius of the grating ring) . . . (3)

where $C_1 = -4.32639991617\text{E-}04$;
$C_2 = -4.71519573549\text{E-}06$;
$C_3 = 2.48970933136\text{E-}08$;
$C_4 = -6.33450529409\text{E-}11$; and
$C_5 = 1.36788418606\text{E-}13$
(E-X represents "$\times 10^{-X}$"), and
r=7.279 [mm] or a grating height of a grating ring (gratin pitch is 34.0 μm) at the vicinity of the position corresponding to r is properly set for the light ray having the incident angle $\theta_1$ at a design wavelength of $\lambda_d=587.56$ [nm], the grating height d is:

$$d=0.888 [\mu m].$$

Figure 5:
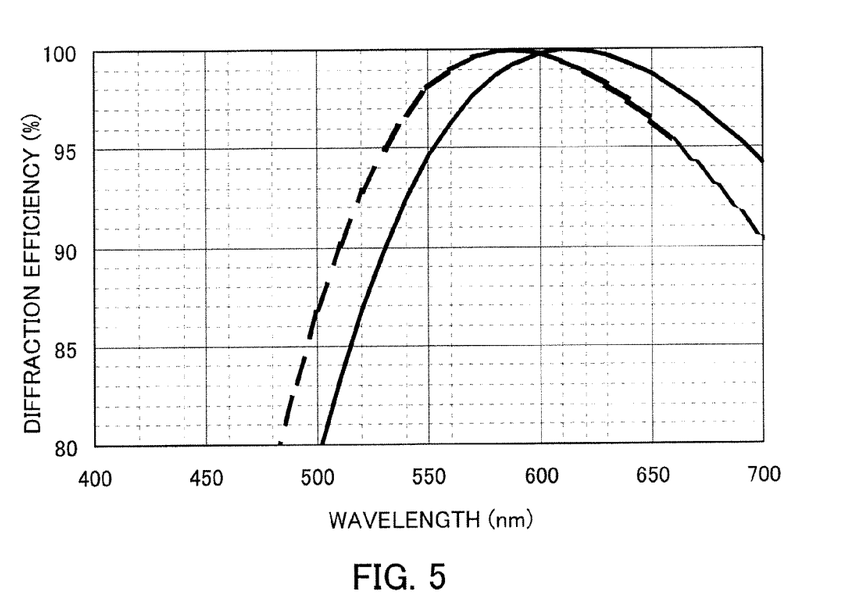
FIG. 5 is a graph showing variations of diffraction efficiency characteristics when the eyeball is displaced in the HMD of FIG. 4A.

A scalar approximation diffraction efficiency characteristic of first-order diffracted light in the above case is shown by a dashed line in FIG. 5. In FIG. 5, the horizontal axis denotes wavelength (nm), and the vertical axis denotes diffraction efficiency (%).

When the displacement amount of the center of the pupil of the eyeball from the optical axis for the DOE 3 designed as above is:

$$y=-4 \text{ [mm], and}$$

the incident angle onto the point P is:

$$\theta_1'=29.422 [°].$$

Therefore, the angle difference $\theta_1'-\theta_1$ is 9.422[°]. The diffraction efficiency in this case has a characteristic is shown by a solid line in FIG. 5. The characteristic maintains, as compared to a case where the center of the pupil of the eyeball has no displacement from the optical axis, a peak of 100% in the diffraction efficiency, but the wavelength corresponding to the peak is shifted to a long wavelength side by about 30 nm. Therefore, the diffraction efficiency increases by 2 to 3% in a wavelength region from an infrared region to a near-infrared region where visibility is low, but it decreases by 3 to 10% in a wavelength region from blue to green, which increases unnecessary diffraction order light.

If the center of the pupil of the eyeball (rotation center of the eyeball) always coincides with the optical axis of the optical system, there exist no problems. However, it is not easy to confirm whether or not they coincide with each other in a state where the HMD is actually mounted on a head of the observer. Further, if a state where they coincide with each other could be obtained, it is significantly possible that they will displace from each other due to own weight of the HMD or movement of the observer. It is difficult to suppress variations in diffraction efficiency caused by variations of the incident angle of the light ray onto the DOE.

Then, in order to suppress decrease of the diffraction efficiency, the embodiment reduces the variations of the incident angle of the light ray onto the DOE when the displacement of the center of the pupil of the eyeball (hereinafter, referred to as eyeball displacement) with respect to the optical axis of the display optical system occurs.

Figure 1A:
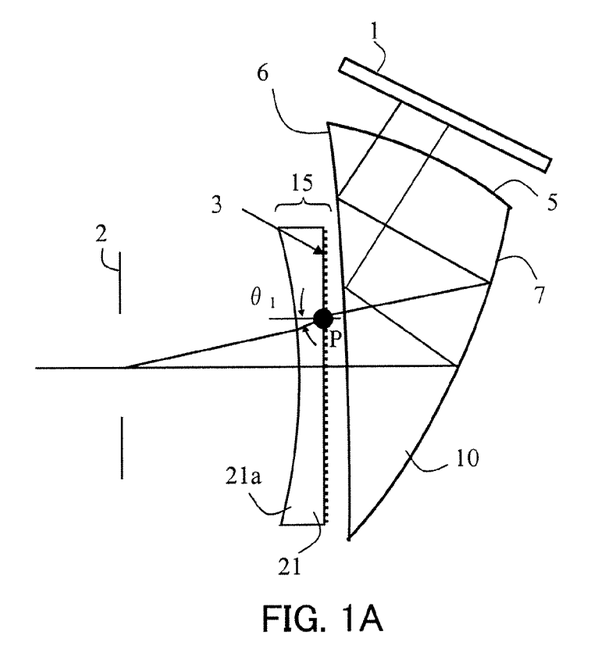
FIG. 1A is a cross-sectional view showing the configuration of an HMD that is a first embodiment (Embodiment 1) of the present invention.

Specifically, as shown in FIG. 1A, the embodiment includes a prism 10 (first optical element) which sequentially reflects a light flux from an image-forming element 1 by plural reflective surfaces 6 and 7 and causes it emerge from the prism 10, and an ocular optical system 15 which includes a DOE 3 and introduces the light flux that has emerged from the prism 10 to the exit pupil 2. Further, the embodiment includes, in the ocular optical system 15, a first portion which is closer to the exit pupil 2 than the DOE 3 (in other words, which is disposed between the DOE 3 and the exit pupil 2) and has a negative optical power.

More specifically, the embodiment provides a negative lens 21 as a second optical element between the prism 10 and the exit pupil 2. The negative lens 21 has an exit pupil side surface 21a which is the first portion closer to the exit pupil 2 than the DOE 3 in the optical system 15 and has a concave shape which generates the negative optical power. The DOE 3 is formed on a prism side plane of the negative lens 21, which makes it possible to use the negative lens 21 as a base member for providing the DOE 3.

Further, no decentered surface having an optical power is provided between the DOE 3 and the exit pupil 2.

Such a configuration can reduce the variations of the incident angle of the light ray entering the DOE 3 with respect to the amount of the eyeball displacement, resulting in suppression of the decrease of diffraction efficiency.

The prism side surface of the negative lens 21 on which the DOE 3 is formed is not limited to be a plane, but may be a concave surface or a convex surface. The DOE 3 may be formed of a material which is the same as or different from that of the negative lens 21. In the embodiment, the DOE 3 is formed of the same material as that of the prism 10 with a refractive index of n. The concave surface 21a and the DOE 3 are not decentered with respect to the optical axis of the display optical system.

In the display optical system of FIG. 1A, the light flux from the image-forming element 1 proceeds on an optical path which is the same as that of the display optical system shown in FIG. 4, emerges from the prism 10, is diffracted by the DOE 3, and then is transmitted through the negative lens 21 to reach the exit pupil 2.

Figure 1B:
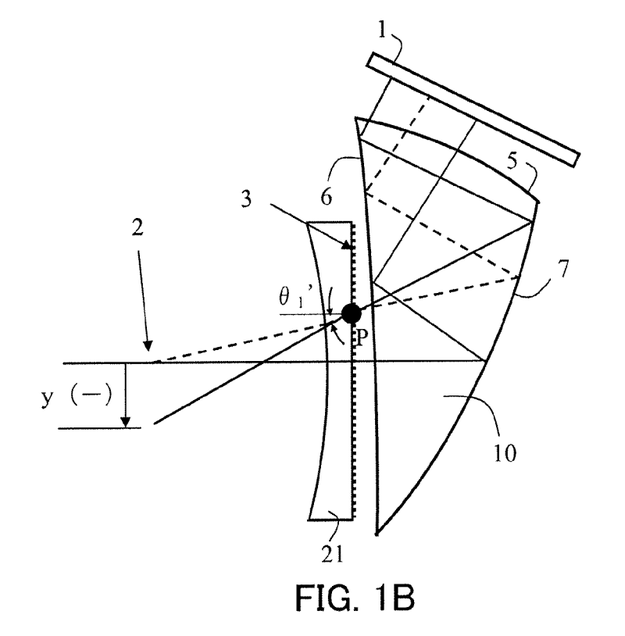
FIG. 1B is a cross-sectional view showing a state where an eyeball is displaced in Embodiment 1.
Figure 2:
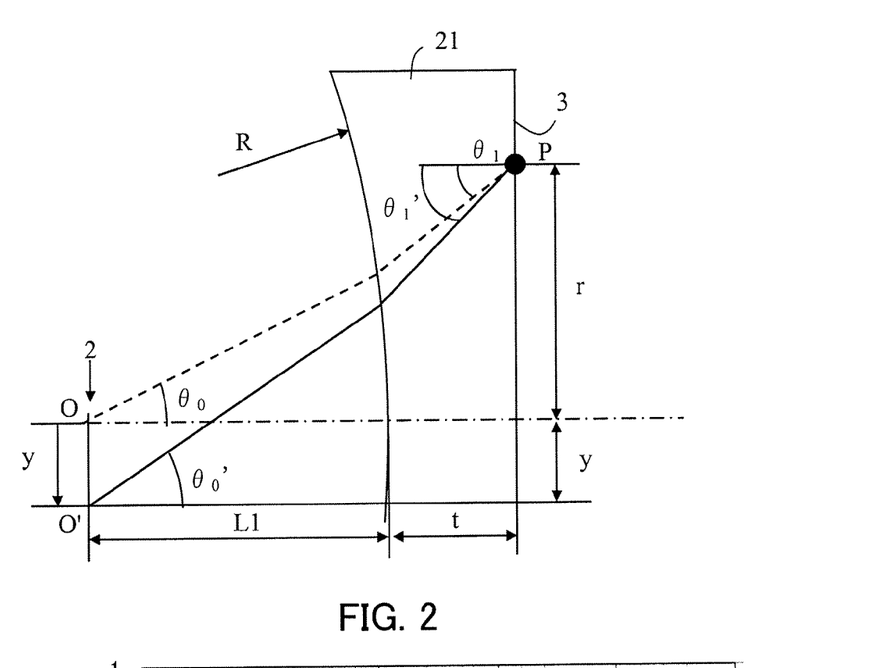
FIG. 2 is a partial enlarged view of Embodiment 1.

A state where the eyeball displacement occurs in the display optical system in FIG. 1A is shown in FIG. 1B. The amount of the variation of the incident angle onto the DOE 3 of the light ray which passes through the point P on the DOE 3 is calculated in the backward ray tracing by using FIG. 1B. FIG. 2 is an enlarged view of a part of FIG. 1B.

When t[mm] represents a thickness of the negative lens 21 at its center, L1[$mm$] represents a distance from the exit pupil 2 to the concave surface 21a on the optical axis, R[mm] represents a curvature radius of the concave surface 21a, the incident angle $\theta_1$ of the light ray forming a view angle $\theta_0$ when the amount of the eyeball displacement is zero is expressed as follows in paraxial calculation:

$$\theta_1 = \theta_0/n + (n-1)\cdot\theta_0\cdot L1/(n\cdot R) \quad (4)$$
$$= \{1/n + (n-1)\cdot L1/(n\cdot R)\}\cdot\theta_0$$

where n represents the refractive index of the material of the DOE 3.

A distance r from the center of the DOE 3 to the point P is expressed as follows:

$$r = L1\cdot\theta_0 + t\cdot\theta_1 \quad (5)$$
$$= L1\cdot\theta_0 + t\cdot\{\theta_0/n + (n-1)\cdot\theta_0\cdot L1/(n\cdot R)\}$$
$$= \{L1 + t/n + t\cdot(n-1)\cdot L1/(n\cdot R)\}\cdot\theta_0$$

On the other hand, in the case where the center of the pupil of the eyeball is displaced to the point O' by y [mm] from the optical axis of the display optical system (in the case where the amount of the eyeball displacement is y), when $\theta_0'$ represents a view angle formed by the light ray that passes through the point O' and the point P is expressed by:

$$r+y=L1\cdot\theta_0'+t\cdot\theta_1'.$$

In this case, the view angle $\theta_0'$ is expressed as follows:

$$\theta_0'=\theta_0+y/\{L1+t/n+t\cdot(n-1)\cdot L1/(n\cdot R)\} \quad (6)$$

Therefore, the incident angle $\theta_1'$ is expressed as follows:

$$\theta_1' = \{1/n + (n-1) \cdot L1/(n \cdot R)\} \cdot \theta_0' \quad (7)$$

$$= \{1/n + (n-1) \cdot L1/(n \cdot R)\} \cdot$$

$$[\{L1 + t/n + t \cdot (n-1) \cdot L1/(n \cdot R)\} \cdot \theta_0 + y]/$$

$$\{L1 + t/n + t \cdot (n-1) \cdot L1/(n \cdot R)\}$$

$$= \{1/n + (n-1) \cdot L1/(n \cdot R)\} \cdot \theta_0 +$$

$$y \cdot \{1/n + (n-1) \cdot L1/(n \cdot R)\}/$$

$$\{L1 + t/n + t \cdot (n-1) \cdot L1/(n \cdot R)\}$$

In this case, $$\theta_1' - \theta_1 = y \cdot \{1/n + (n-1) \cdot L1/(n \cdot R)\}/\{L1 + t/n + t \cdot (n-1) \cdot L1/(n \cdot R)\}$$

$$\theta_0' - \theta_0 = y/\{L1 + t/n + t \cdot (n-1) \cdot L1/(n \cdot R)\}.$$

Therefore, a ratio of the incident angle difference of the light ray impinging on the DOE 3 to the view angle difference is expressed as follows:

$$(\theta_1' - \theta_1)/(\theta_0' - \theta_0) = 1/n + (n-1) \cdot L1/(n \cdot R) \quad (8)$$

Figure 3:
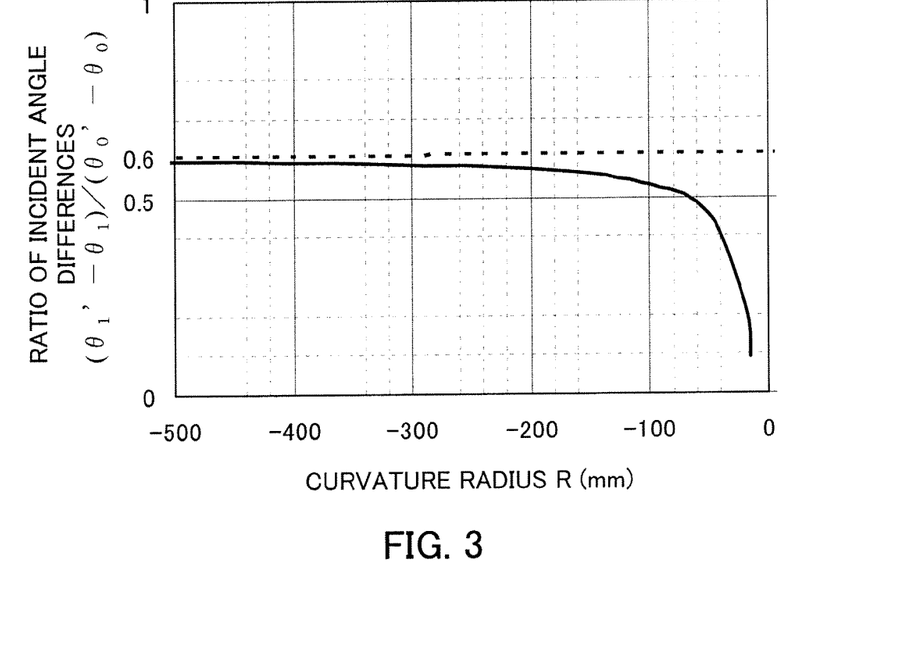
FIG. 3 is a graph showing a relationship between a curvature radius of a concave surface provided in the HMD of FIG. 1A and an incident angle of a light ray onto the DOE.

For example, when L1=20 [mm] and n=1.63554, variations of the value of the expression (8) with respect to R is shown by a solid line in FIG. 3.

In FIG. 3, the horizontal axis represents the curvature radius R[mm] of the concave surface 21a and the vertical axis represents the ratio of the incident angle difference $(\theta_1'-\theta_1)/(\theta_0'-\theta_0)$. As shown in FIG. 3, the ratio of the incident angle difference $(\theta_1'-\theta_1)/(\theta_0'-\theta_0)$ decreases as the negative optical power of the concave surface 21a increases. That is, the variation amount of the incident angle $\theta_1$ onto the DOE 3 with respect to the eyeball displacement amount y decreases as the negative optical power of the concave surface 21a increases. Especially, if R<0, the value of the expression (8) can be less than 0.6, thereby sufficiently suppressing the variation of the incident angle of the light ray onto the DOE 3.

Figure 16:
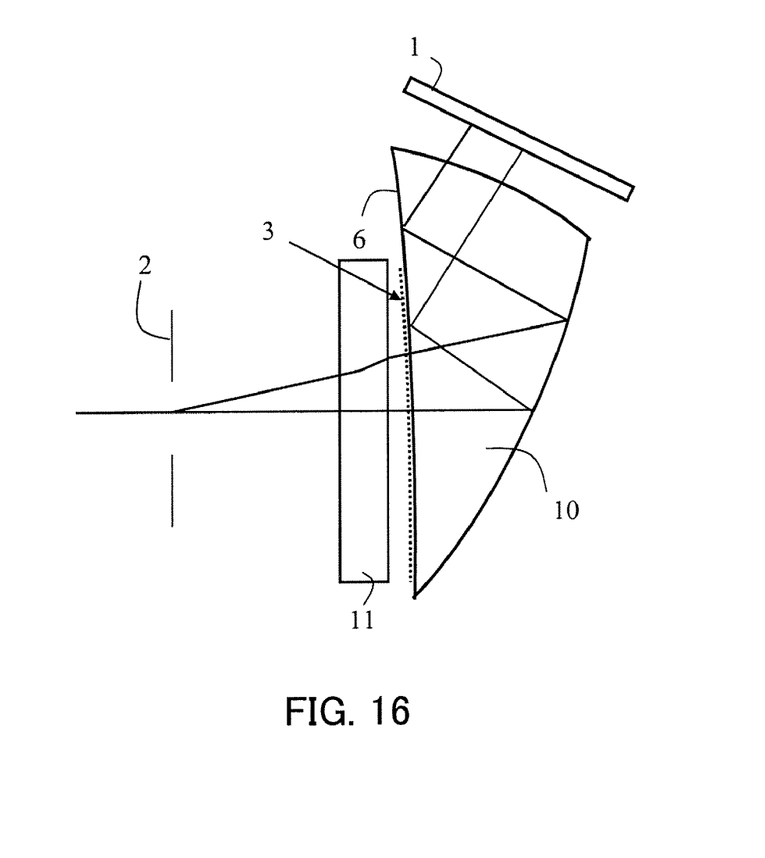
FIG. 16 is a cross-sectional view showing a modified example of the HMD shown in Embodiment 1.

FIG. 1A shows the case where the DOE 3 is formed on the surface of the negative lens 21. However, as shown in FIG. 16, the DOE 3 may be formed on an external surface of the exit surface (second surface) 6 of the prism 10 when the exit surface 6 has a rotationally symmetric shape with respect to the optical axis of the display optical system.

2. In the display optical system of the HMD of the embodiment, the DOE 3 may be a multilayer diffractive optical element (hereinafter, referred to as multilayer DOE) which is formed by laminating (layering) plural diffraction grating portions formed of mutually different materials.

The single-layer DOE can achieve a diffraction efficiency of 100% in a specific diffraction order basically only for the light ray of a specific single wavelength and a specific incident angle. Therefore, for instance, in a case where visual light which contains wavelength components of three primary colors (R, G and B) enters the single-layer DOE, it is difficult to obtain a high diffraction efficiency for all of the wavelength components in the visual light, which results in generation of colored flare light.

Figure 6:
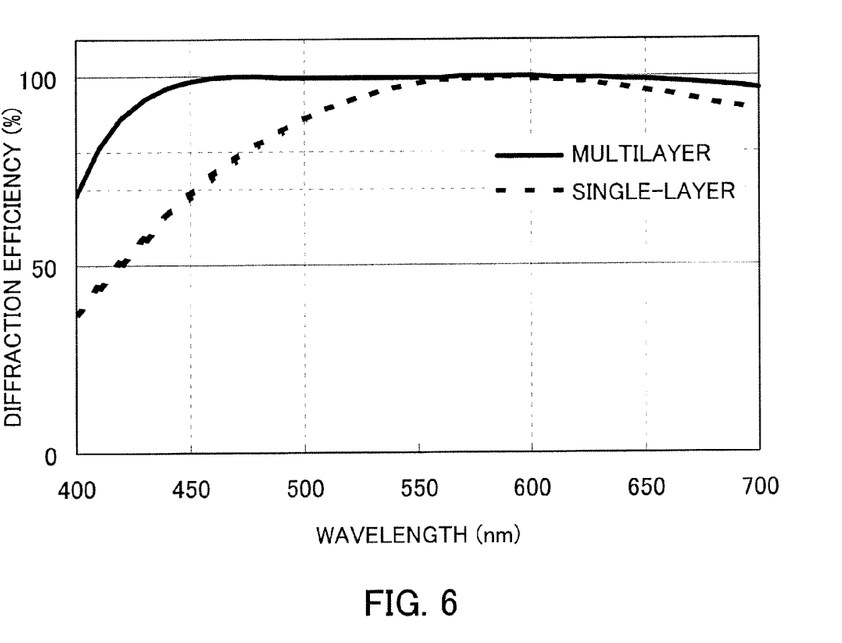
FIG. 6 is a graph showing an example of diffraction efficiency characteristics of a single-layer DOE and a multilayer DOE.

On the other hand, in the multilayer DOE which is formed by laminating plural diffraction grating portions formed of mutually different materials, properly setting the diffraction order of each diffraction grating portion, that is, properly setting the height of the grating rings makes it possible to provide a diffraction efficiency close to 100% in a wide wavelength region. FIG. 6 shows an example of diffraction efficiency characteristics of the single-layer DOE and an example of diffraction efficiency characteristics of a two layer type multilayer DOE which has a first diffraction grating portion and a second diffraction grating portion are laminated in order from an exit pupil side. In FIG. 6, the horizontal axis represents wavelength (nm) and the vertical axis represents diffraction efficiency (%).

Each of the first and second diffraction grating portions has a rotationally symmetric shape. An air layer is interposed as an intermediate layer between the first diffraction grating portion (hereinafter, referred to as first diffraction layer) and the second diffraction grating portion (hereinafter, referred to as second diffraction layer).

In the first and second diffraction layers, optical path difference functions $\Phi_1$ and $\Phi_2$ are expressed as follows for properly setting heights $d_1$ and $d_2$ of the grating rings including the points P with the distance r on the optical axis from the centers of the first and second diffraction layers:

$$\Phi_1(r,\lambda) = \{n_1(\lambda) \cdot \cos\theta_1 - n_2(\lambda) \cdot \cos\theta_2\} \cdot d_1(r)$$

$$(\theta_2 = \sin^{-1}[\{n_1(\lambda) \cdot \sin\theta_1 - m_1 \cdot \lambda/p\}/n_2])$$

$$\Phi_2(r,\lambda) = \{n_2(\lambda) \cdot \cos\theta_2 - n_3(\lambda) \cdot \cos\theta_3\} \cdot d_2(r)$$

$$(\theta_3 = \sin^{-1}[\{n_2(\lambda) \cdot \sin\theta_2 - m_2 \lambda/p\}/n_3]) \quad (5)$$

where $\lambda$ represents a wavelength of a light ray entering the first diffraction layer, and $\theta_1$ represents an incident angle of that light. p represents a grating pitch of the first and second diffraction layer. Further, $n_1$ and $n_2$ respectively represent an entrance side refractive index and an intermediate layer side refractive index of a grating surface of the first diffraction layer, $m_1$ represents a diffraction order of the first diffraction layer, and $\theta_2$ represents an $m_1$-th order diffraction angle. Moreover, $n_3$ represents a refractive index of the second diffraction layer, $m_2$ represents a diffraction order of the second diffraction layer, and $E_3$ represents an $m_2$-th order diffraction angle of the second diffraction layer.

The total scalar approximation diffraction efficiency of the first and second diffraction layers is expressed as follows:

$$\eta(r,\lambda) = \sin c^2 [\pi \cdot \{m - \{\Phi_1(r,\lambda) + \Phi_2(r,\lambda)\}/\lambda\}] (m = m_1 + m_2) \quad (6)$$

Even when such a multilayer DOE is used, the grating height of each layer is set such that the diffraction efficiency $\eta$ for a specific diffraction order light becomes the maximum.

Although the materials of the respective layers are mutually different, the material of each layer and the material of the base member may be mutually different or mutually the same. That is, a DOE layer formed of a material different from that of a base member may be formed on the base member, and a DOE layer may be formed integrally with a base member. Further, the first diffraction layer and the second diffraction layer may contact each other without providing an air layer therebetween.

Figure 7:
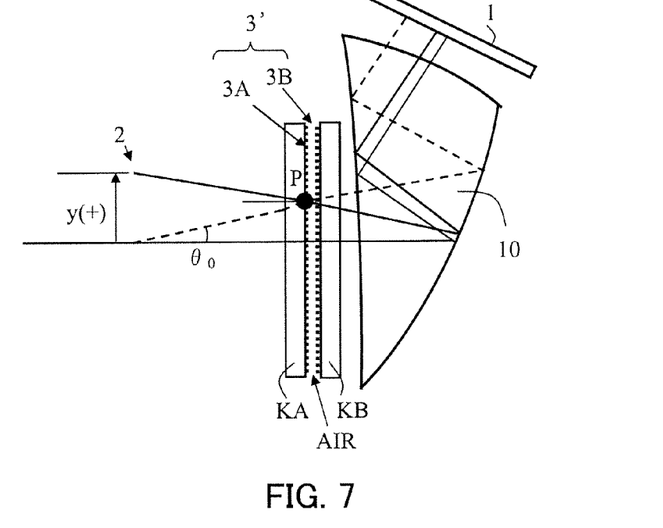
FIG. 7 is a cross-sectional view showing the configuration of a conventional HMD in which a base member of the multilayer DOE is a parallel plate.

FIG. 7 shows a display optical system which includes a multilayer DOE 3' in which the first diffraction layer 3A disposed on the exit pupil side is formed on a first base member KA having a refractive index of $n_1$ and a second diffraction layer 3B disposed on the prism side is formed on a second base member KB having a refractive index of $n_2$. Each of the base members KA and KB is a parallel plate with a thickness of 1 mm. On surfaces facing each other of the two base members KA and KB, the first diffraction layer 3A and the second diffraction layer 3B are formed. Between the first diffraction layer 3A and the second diffraction layer 3B, an air layer AIR is formed.

When the grating height of the first diffraction layer 3A is defined as d1, and the grating height of the second diffraction layer 3B is defined as d2, d1 and d2 are set so as to achieve a high diffraction efficiency in a wide wavelength region, as mentioned above.

When the phase function of the multilayer DOE 3' is expressed by the expression (3) and $n_1(\lambda_d)$=1.52415, $n_2(\lambda_d)$= 1.63554, the incident angle $\theta_1$ $(\lambda_d)$ of a light ray onto the first diffraction layer 3A is 12.968[°]. The distance r from the center of the multilayer DOE 3' to the point P is 7.521 [mm].

In this display optical system, when the eyeball of the observer displaces upward (+direction) by y=4 [mm] with respect to the center of the exit pupil 2, the view angle $\theta_0$, is 9.662[°]. The incident angle $\theta_1(\lambda_d)'$ of a light ray with a wavelength of $\lambda_d$ onto the DOE 3' is 6.322[°] and the incident angle onto the point P changes by 6.646[°].

Figure 8:
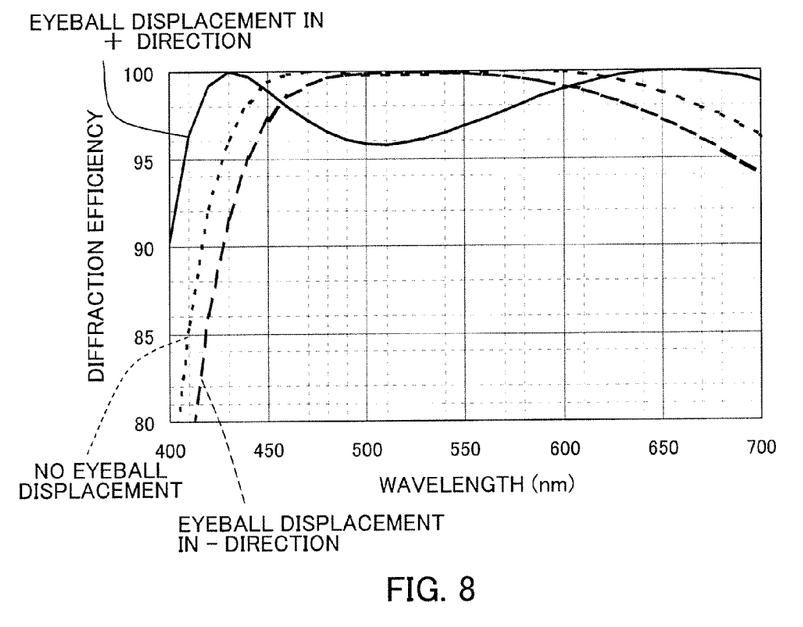
FIG. 8 is a graph showing variation in diffraction efficiency characteristics when the eyeball is displaced in the HMD shown in FIG. 7.

Variations of the diffraction efficiency in this case are shown in FIG. 8. In FIG. 8, the horizontal axis represents wavelength (nm), and the vertical axis represents diffraction efficiency (%). A dotted line represents diffraction efficiency in a case where there is no eyeball displacement, a solid line represents diffraction efficiency in a case where the eyeball displacement is +4 mm, and a dashed line represents diffraction efficiency in a case where the eyeball displacement is −4 mm.

In a case where the eyeball displaces in the +direction, in a near-ultraviolet region and a near-infrared region where spectral sensitivity is low, the diffraction efficiency increases. However, in a green wavelength region where a luminosity factor (visual sensitivity) is highest, the diffraction efficiency decreases by 4 to 5%. This means unnecessary diffracted light of the zero-th or second order is generated by a few percents.

On the contrary, when the eyeball displaces in the—direction, even though the diffraction efficiency decreases a little in the green wavelength region, the diffraction efficiency in wavelength regions shorter and longer than the green wavelength region becomes large.

In the multilayer DOE, when the incident angle of the light ray onto the DOE reduces, not only the characteristics thereof in the near-ultraviolet and near-infrared regions where the luminosity factor is low decreases, but also the diffraction efficiency in the visible wavelength region (especially in the green wavelength region where the luminosity factor is high) significantly decreases.

Figure 9:
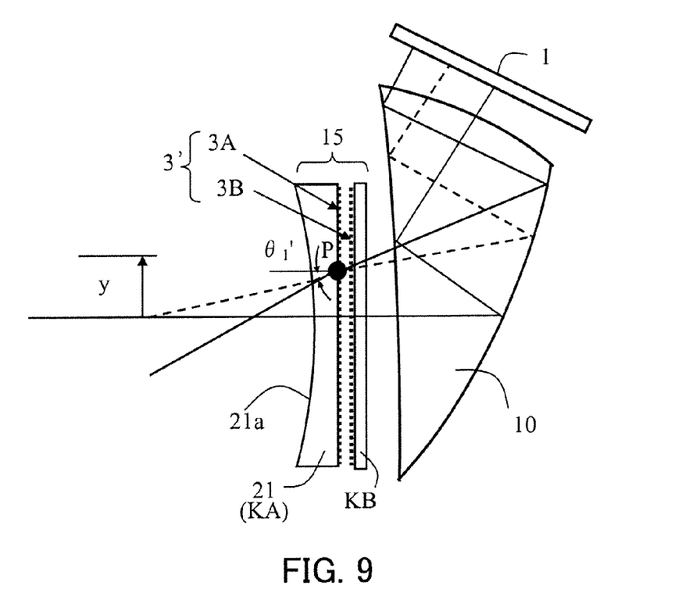
FIG. 9 is a sectional view showing the configuration of an HMD in Embodiment 2 of the present invention.
Figure 12:
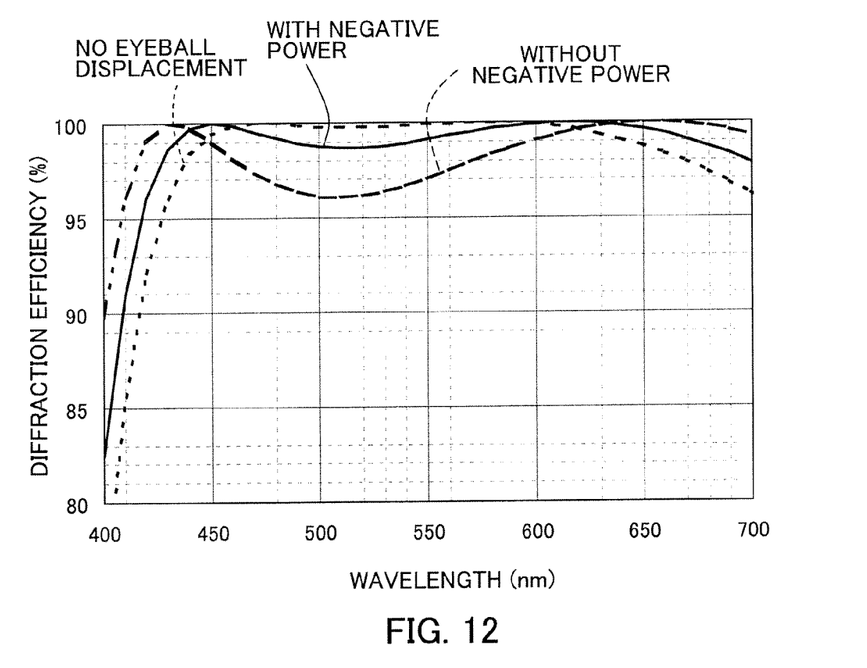
FIG. 12 is a graph showing variation of diffraction efficiency characteristics when the eyeball is displaced in the HMD that is a third embodiment (Embodiment 3) of the present invention.

Then, as shown in FIG. 9, in the display optical system including the multilayer DOE 3', a negative optical power is provided to a portion closer to the exit pupil 2 than the DOE 3' in the ocular optical system 15 by forming the exit pupil side surface 21a of the negative lens 21 which corresponds to the base member KA of the first diffraction layer as a concave surface. Thereby, as is the case with the display optical system including the above-described single-layer DOE 3, the variation of the incident angle of the light ray onto the DOE 3' can be reduced when the eyeball displaces with respect to the center of the exit pupil 2. When the curvature radius R of the concave surface 21a in the above case is 80 [mm], the incident angle $\theta_1'$ onto the DOE 3' is 8.686[°], and the diffraction efficiency shown by a solid line in FIG. 12 is obtained. In FIG. 12, the horizontal axis represents wavelength (nm) and the vertical axis represents the diffraction efficiency (&). A dashed line represents the diffraction efficiency in a case where the above-described negative optical power is not provided when the eyeball displaces with respect to the center of the exit pupil 2.

Such provision of the negative optical power between the multilayer DOE 3' and the exit pupil 2 reduces, as is the case where the single-layer DOE is used, the variation of the incident angle of the light ray onto the DOE 3' when the eyeball displaces with respect to the center of the exit pupil 2, which results in suppression of the decrease of diffraction efficiency.

The second diffraction layer 3B on the prism side may be provided on an external surface of the exit surface (second surface 6) of the prism 10, though this is not shown.

3. In the present embodiment, a positive optical power may be provided to a portion (second portion) closer to the first optical element (prism 10) than the DOE (3 or 3') in the ocular optical system 15.

As described above, providing the negative optical power to the portion closer to the exit pupil 2 than the DOE (3 or 3') in the ocular optical system 15 causes refraction of the principal rays into a direction in which the principal rays are diverged at the concave surface 21a in the backward ray tracing. Therefore, it is necessary to increase an effective diameter of the prism 10. Further, since it is necessary to increase a positive optical power provided to the prism 10, aberration correction burden of each surface of the prism 10 may increase.

Figure 14:
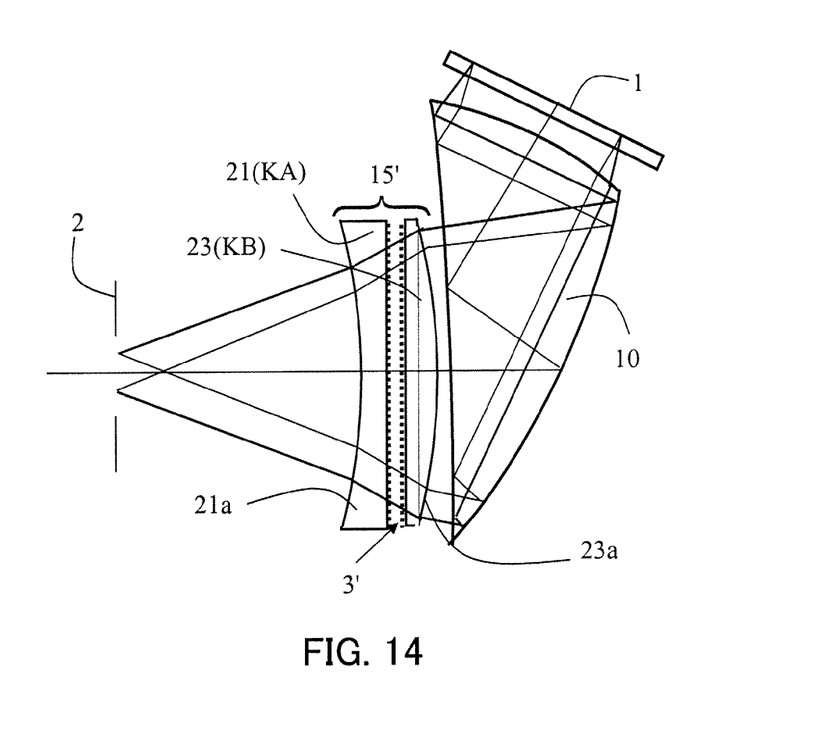
FIG. 14 is a cross-sectional view showing the configuration of an HMD that is a third embodiment (Embodiment 3) of the present invention.

A configuration for avoiding this problem is shown in FIG. 14. FIG. 14 shows a display optical system in which the multilayer DOE 3' is provided in an ocular optical system 15'. In FIG. 14, a positive lens 23 which is a third optical element that has a positive optical power and constitutes part of the ocular optical system 15' is provided at a position closer to the prism 10 (that is, closer to the first optical element) than the multilayer DOE 3' is provided. Forming a prism side surface 23a of the positive lens 23 as a convex surface provides the positive optical power to the positive lens 23. Further, forming the second diffraction layer 3B on an exit pupil side plane of the positive lens 23 causes the positive lens 23 to function as the second base member KB.

The positive power produced by the positive lens 23 balances out the negative power of the concave surface 21a provided at the position closer to the exit pupil 2 than the multilayer DOE 3', which suppresses an increases of the size of the prism 10. A similar configuration can be applied to the display optical system in which the single-layer DOE 3 is provided in the ocular optical system 15 shown in FIGS. 1A and 1B.

Further, using materials whose Abbe numbers are mutually different for the negative lens 21 and the positive lens 23 is effective to balance out longitudinal chromatic aberration which is excessively generated in the DOE 3' (or 3).

4. In the present embodiment, it is preferable that a portion (third portion) closer to the exit pupil than the DOE in the ocular optical system has a negative optical power at least in an interpupillary direction of eyes of the observer.

In the HMD of the present embodiment, the above-described image-forming element 1 and display optical system (10, 15, and 15') are provided for each of right and left eyes of the observer, which causes the observer to observe the displayed image through the right and left eyes. Some HMDs are equipped with an interpupillary distance adjusting mechanism which can adjust a distance between the two image-forming element and display optical systems in a right-and-left direction to fit an interpupillary distance of the observer. However, in order to reduce the weight of the HMD, it is desirable that such a mechanism is not provided.

In a case where the interpupillary distance adjusting mechanism is not provided, an average interpupillary distance of general observers is used for fixing the distance of the display optical systems for the right and left eyes in the right-and-left direction (in the interpupillary direction). In this case, at least one eyeball is displaced with respect to the center of the exit pupil of the display optical system in the right-and-left direction due to an individual difference of the interpupillary distance of each observer.

Therefore, the negative optical power provided to the portion closer to the exit pupil than the DOE in the ocular optical system may be effective only in the right-and-left direction or may be stronger in the right-and-left direction than that provided to that portion in an up-and-down direction. Specifically, the concave surface 21a of the negative lens 21 shown in FIGS. 1A, 9 and 14 may use a cylindrical surface having a negative optical power only in the right-and-left direction or may use a toric surface having a strong negative optical power in the right-and-left direction and a weak negative optical power in the up-and-down direction.

Thereby, in the left- and right direction in which the eyeball is easily displaced when the interpupillary distance adjusting mechanism is not provided, the decrease of the diffraction efficiency caused by the eyeball displacement can be suppressed and thus the flare light can be reduced.

Specific embodiments will hereinafter be described as Embodiments 2 to 4.

Embodiment 2

Figure 10:
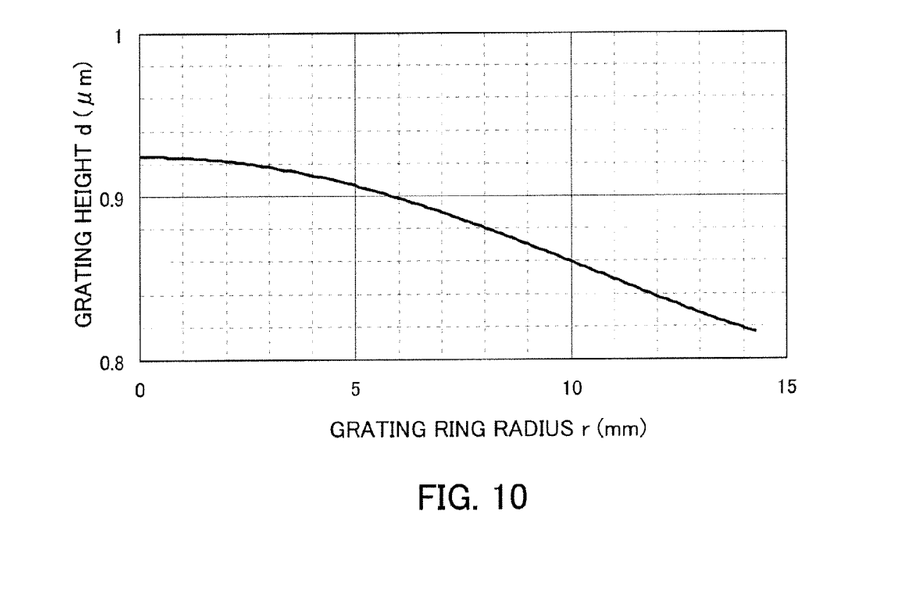
FIG. 10 is a graph showing a design example of a grating height in the HMD of Embodiment 1.

A display optical system of an HMD that is Embodiment 1 includes the single-layer DOE 3 having the blazed shape and being shown in FIGS. 1A, 1B and 2. In the display optical system, the prism 10 is formed of a material whose refractive index $n(\lambda)$ is 1.63554. The phase function $\phi$ of the blazed single-layer DOE 3 is expressed by the expression (3), and the grating height of each grating ring is set as shown in FIG. 10. In FIG. 10, the horizontal axis represents the distance r (grating ring radius) on the DOE 3 from the center on the optical axis of the display optical system, and the vertical axis represents the grating height.

Description will be made of a light ray which passes through the point P on the DOE 3 in a case where the distance L1 on the optical axis from the exit pupil 2 to the concave surface 21a of the negative lens 21 is 20 mm, the curvature radius R of the concave surface 21a is 100 [mm], and the thickness of the negative lens 21 at its center is 1.0 [mm].

Figure 11:
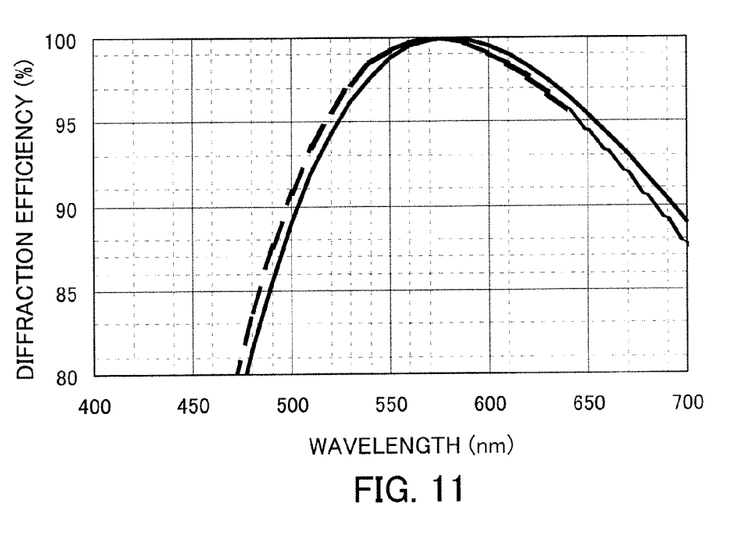
FIG. 11 is a graph showing variation of diffraction efficiency characteristics when the eyeball is displaced in the HMD in Embodiment 1.

When the distance r from the center of the DOE 3 to the point P is 7.158 [mm], the incident angle $\theta1$ onto the DOE 3 of the light ray (shown by the dashed line in FIG. 1B) which passes through the center of the exit pupil and the point P is 10.118[°], which is based on the expression (4). The diffraction efficiency in this case is shown by a dashed line in FIG. 11.

When the eyeball displacement amount y is −4 [mm], the incident angle $\theta1'$ onto the DOE 3 of the light ray (shown by the solid line in FIG. 1B) which passes through the center of the pupil of the eyeball and the point P is 15.772[°], which is based on the expression (7).

Therefore, the variation amount of the incident angle of the light ray onto the point P (that is, the difference of the incident angles $\theta1'-\theta1$) is 5.654[°], and the diffraction efficiency characteristic is shown by a solid line in FIG. 5. The diffraction efficiency characteristic in this case varies such that a peak of the diffraction efficiency shifts by about 10 nm and the diffraction efficiency in the blue to the green wavelength regions decreases by only about 1 to 2%. In other words, the variation of the diffraction efficiency is significantly reduced, compared with the conventional one shown in FIG. 5.

Embodiment 3

A display optical system of an HMD that is Embodiment 2 includes the multilayer DOE 3' shown in FIG. 9. In the display optical system, the prism 10 is formed of a material whose refractive index $n(\lambda d)$ is 1.63554. The refractive index of the negative lens 21 as the first base member KA and the material of the first diffraction layer 3A is $n1(\lambda d)=1.52415$. The refractive index of the second base member KB and the material of the second diffraction layer 3B is $n2(\lambda d)=1.63554$.

Figure 13:
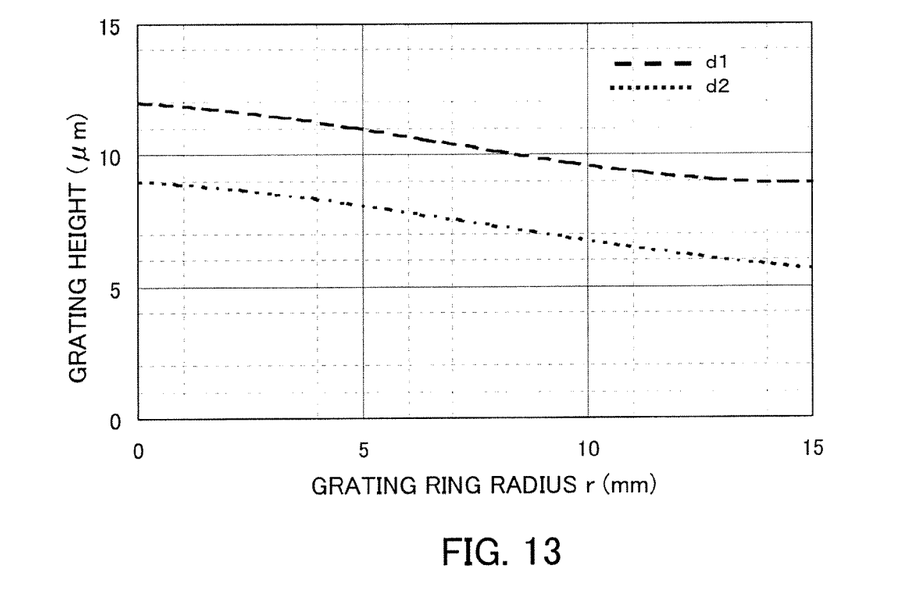
FIG. 13 is a graph showing a design example of a grating height in the HMD in Embodiment 2.

The grating heights d1 and d2 of the first and second diffraction layers 3A and 3B are set as shown in FIG. 13 in order to obtain a high diffraction efficiency at a wide wavelength region.

In FIG. 13, the horizontal axis represents the distance r (radius of the grating ring) on the DOE 3' from the center on the optical axis of the display optical system, and the vertical axis represents the grating heights d1 and d2. The design diffraction orders of the first and the second diffraction layers 3A and 3B are set such that the total diffraction order thereof is +1.

In the present embodiment, the variation of the diffraction efficiency characteristics when the eyeball is displaced from the center of the exit pupil 2 is shown in FIG. 12.

Embodiment 4

A display optical system of an HMD that is Embodiment 3 includes the multilayer DOE 3' shown in FIG. 14. In the display optical system, the prism 10 is formed of a material whose refractive index $n(\lambda d)$ is 1.63554. The refractive index of the negative lens 21 as the first base member KA and the material of the first diffraction layer 3A is $n1(\lambda d)=1.52415$. The refractive index of the second base member KB and the material of the positive lens 23 as the second diffraction layer 3B is $n2(\lambda d)=1.63554$.

The grating heights d1 and d2 of the first and second diffraction layers 3A and 3B are set as shown in FIG. 13 in order to obtain a high diffraction efficiency at a wide wavelength region, as in Embodiment 2. The design diffraction orders of the first and the second diffraction layers 3A and 3B are set as in Embodiment 2. In the present embodiment, the variation of the diffraction efficiency characteristics when the eyeball is displaced from the center of the exit pupil 2 is shown in FIG. 12, as in Embodiment 2.

Embodiment 5

Figure 15:
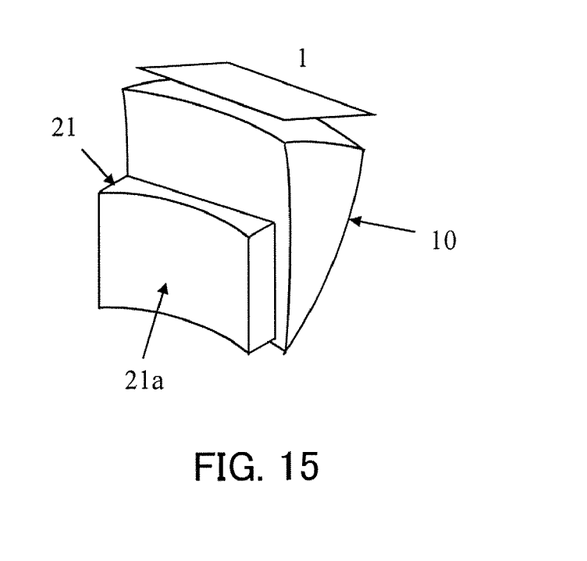
FIG. 15 is a cross-sectional view showing the configuration of an HMD that is a fourth embodiment (Embodiment 4) of the present invention.

FIG. 15 shows an external view of the display optical system of the HMDs of Embodiments 2 to 4, which uses a cylindrical surface as the concave surface 21a of the negative lens 21. The cylindrical surface has a negative optical power only in the right-and-left direction.

According to the embodiments, in the image display apparatus using the DOE, unnecessary diffraction order light which is generated due to inconsistency of the visual axis of the observer and the optical axis of the optical system can be effectively reduced. Therefore, even when the eyeball rotates or displaces with respect to the exit pupil, the image display apparatus can present an image having good image quality.

Furthermore, the present invention is not limited to these embodiments and various variations and modifications may be made without departing from the scope of the present invention.

For example, in each of the above embodiments, the description was made of the case where the prism (first optical element) in which two surfaces among three surfaces function as reflective surfaces. However, an optical element other than the prism may be used as the first optical element.

Further, in each of the above embodiments, the description was made of the case where one lens (negative or positive lens) is provided at the position closer to the exit pupil or to the prism than the DOE in the ocular optical system. However, plural lenses including the second or third optical element can be provided. In this case, a combined optical power of the plural lenses may be negative or positive.

In the above embodiments, the description was made of the HMD. However, the present invention can be applied to image display apparatuses other than the HMD.

This application claims the benefit of Japanese Patent Application No. 2007-322646, filed on Dec. 13, 2007, which is hereby incorporated by reference herein in its entirety.

What is claimed is:

1. An image display apparatus comprising:
   an image-forming element configured to form an original image;
   a first optical element configured to reflect a light flux from the image-forming element sequentially by plural reflective surfaces to cause the light flux to emerge from the first optical element; and
   an optical system configured to introduce the light flux from the first optical element to an exit pupil of the optical system,
   wherein the optical system includes a diffractive optical element configured to transmit by diffraction the light flux emerging from the first optical element,
   wherein a ray of the light flux emerging from the first optical element and impinging on the diffractive optical element is transmitted therethrough at an exiting angle different than an incident angle thereof,
   wherein, in the optical system, a first portion closer to the exit pupil than the diffractive optical element has a negative optical power, and
   wherein no decentered surface having an optical power is provided in a light path between the diffractive optical element and the exit pupil.

2. The image display apparatus according to claim 1, wherein the diffractive optical element is provided on a surface of a second optical element included in the optical system.

3. The image display apparatus according to claim 1, wherein the diffractive optical element is provided on an external surface of an exit surface of the first optical element, and
   wherein the external surface of the exit surface of the first optical element is rotationally symmetric with respect to an optical axis of the optical system.

4. The image display apparatus according to claim 1, wherein the optical system includes a second portion having a positive optical power, the second portion being provided closer to the first optical element than the diffractive optical element.

5. The image display apparatus according to claim 1, wherein the diffractive optical element is a multilayer diffractive optical element in which plural diffractive grating portions formed of mutually different materials are laminated.

6. The image display apparatus according to claim 1, wherein, in the optical system, a third portion closer to the exit pupil than the diffractive optical element has a negative optical power at least in an interpupillary direction of eyes of an observer.

* * * * *